(12) United States Patent
Inoue et al.

(10) Patent No.: US 6,938,165 B2
(45) Date of Patent: Aug. 30, 2005

(54) PROGRAM WRITABLE IC CARD AND METHOD THEREOF

(75) Inventors: Masayuki Inoue, Fujisawa (JP); Shigeyuki Itoh, Zushi (JP); Yutaka Takami, Yokohama (JP); Kenji Matsumoto, Yokohama (JP)

(73) Assignees: Hitachi, Ltd., Tokyo (JP); Hitachi Video and Information Systems, Inc., Yokohama (JP)

( * ) Notice: Subject to any disclaimer, the term of this patent is extended or adjusted under 35 U.S.C. 154(b) by 640 days.

(21) Appl. No.: 09/933,801

(22) Filed: Aug. 22, 2001

(65) Prior Publication Data

US 2001/0052079 A1 Dec. 13, 2001

Related U.S. Application Data

(63) Continuation of application No. 08/904,137, filed on Jul. 31, 1997.

(30) Foreign Application Priority Data

Sep. 3, 1996 (JP) .............................. 8-232408

(51) Int. Cl.[7] .............................................. H04L 9/32
(52) U.S. Cl. ........................................ 713/193; 235/375
(58) Field of Search ................................ 713/193, 189, 713/192, 194; 235/375

(56) References Cited

U.S. PATENT DOCUMENTS

| | | | | |
|---|---|---|---|---|
| 4,827,512 A | * | 5/1989 | Hirokawa et al. ........... 713/191 |
| 5,202,923 A | * | 4/1993 | Kuriyama .................... 713/187 |
| 5,452,431 A | | 9/1995 | Bournas | |
| 5,499,293 A | | 3/1996 | Behram et al. ................. 380/4 |
| 5,867,579 A | | 2/1999 | Saito ........................... 380/25 |

FOREIGN PATENT DOCUMENTS

| | | |
|---|---|---|
| JP | 58139265 | 8/1983 |
| JP | 6010336 | 1/1985 |
| JP | 6083157 | * 5/1985 |
| JP | 63247890 | 10/1988 |
| JP | 2159691 | 6/1990 |
| JP | 289365 | * 8/1990 |
| JP | 387988 | 4/1991 |
| JP | 3147086 | 6/1991 |
| JP | 3296842 | * 12/1991 |
| JP | 447773 | * 4/1992 |
| JP | 6176209 | 6/1994 |
| JP | 6259615 | 9/1994 |
| JP | 6309384 | * 11/1994 |
| JP | 6309558 | * 11/1994 |
| JP | 8161558 | 6/1996 |

OTHER PUBLICATIONS

Comments from the Japanese Associate regarding the relevance of Japanese Application No. Sho 60–83157, May 11, 1985.*
Comments from the Japanese Associate regarding the relevance of Japanese Application No. Hei–3296842, Dec. 27, 1991.*
Office Action dated Mar. 7, 2000 Japanese Patent Office.*

* cited by examiner

*Primary Examiner*—Kim Vu
*Assistant Examiner*—Paula Klimach
(74) *Attorney, Agent, or Firm*—Mattingly, Staner, Malur & Brundidge, P.C.

(57) ABSTRACT

An IC card and a method thereof for adding or changing a program for a memory for writing without adversely affecting the function of the IC card and by keeping the security of a program to be written later by restricting writing by a write control program having a decryption function or a program code conversion function.

14 Claims, 6 Drawing Sheets

US 6,938,165 B2

PROGRAM WRITABLE IC CARD AND METHOD THEREOF

This is a continuation of application Ser. No. 08/904,137, filed Jul. 31, 1997.

BACKGROUND OF THE INVENTION

1. Field of the Invention

The present invention relates to an IC card having a writable memory and more particularly to an IC card for writing a program in this memory by keeping security and a method thereof.

2. Description of the Prior Art

An IC card is excellent in security and finds wide applications. Generally, an IC card has a built-in memory for writing and storing a program as well as various information which can be erased electrically and is used to write various information after a user owns it. For example, the invention disclosed in Japanese Laid-Open Patent Application 6-309558 stores customer information in an IC card and provides quick services. In Japanese Laid-Open Patent Application 6-309384, a use that inspection results and dosing data of a patient in a medical institution are stored in an IC card is described. Furthermore, recently, study has been given to use of an IC card in an electronic money system and an IC card is used to write money information.

As mentioned above, the use method of writing information in an IC card is generally carried out. To keep security, the use method of changing and adding to an internal program stored already and writing a new program is limited.

To improve or change the function of an IC card, there is a case that changing of a program is necessary. Furthermore, to keep security, a case that changing of the cryption method is necessary also may be caused. However, to make it possible to modify an already stored program leads to information opening to public of the microprocessor chip of the IC card and the program thereof and it is not suitable for the use of this IC card for which high security is evaluated.

SUMMARY OF THE INVENTION

Therefore, an object of the present invention is to provide an IC card for changing or adding to an internal program with the high security of an IC card kept and writing a new program and a method thereof.

To accomplish this object, the present invention is a program writable IC card comprising a microprocessor and a memory for storing a program write control program having at least one of the decryption function and the function for converting a program code and a program for the aforementioned microprocessor, wherein when the program for the microprocessor is given from the outside, the IC card performs at least one of the decryption process and the process of converting a program code according to the program write control program and stores the program in the memory.

More concretely, according to the present invention which is a program writable IC card comprising a microprocessor and a memory storing a program for the microprocessor, one characteristic is a constitution that the IC card includes a write control program having the decryption function and/or the program code conversion function in a program built in the IC card and a memory for program writing and the other characteristic is a constitution that the IC card includes a write control microprocessor for executing the write control program having the decryption function and/or the program code conversion function in addition to the microprocessor for IC card, a means for switching the two microprocessors, and a memory for program writing.

Another characteristic of the present invention is a constitution that the IC card having a microprocessor whose technical information such as a specification is not opened to public includes a microprocessor whose technical information such as a catalog and a specification is opened to public, a memory for program writing for storing a program for the microprocessor, and a means for switching the two microprocessors.

These constitutions make it possible to change or add to an internal program by keeping the security necessary for the IC card and to write a new program.

The foregoing and other objects, advantages, manner of operation and novel features of the present invention will be understood from the following detailed description when read in connection with the accompanying drawings.

DETAILED DESCRIPTION OF THE PREFERRED EMBODIMENTS

Figure 1:
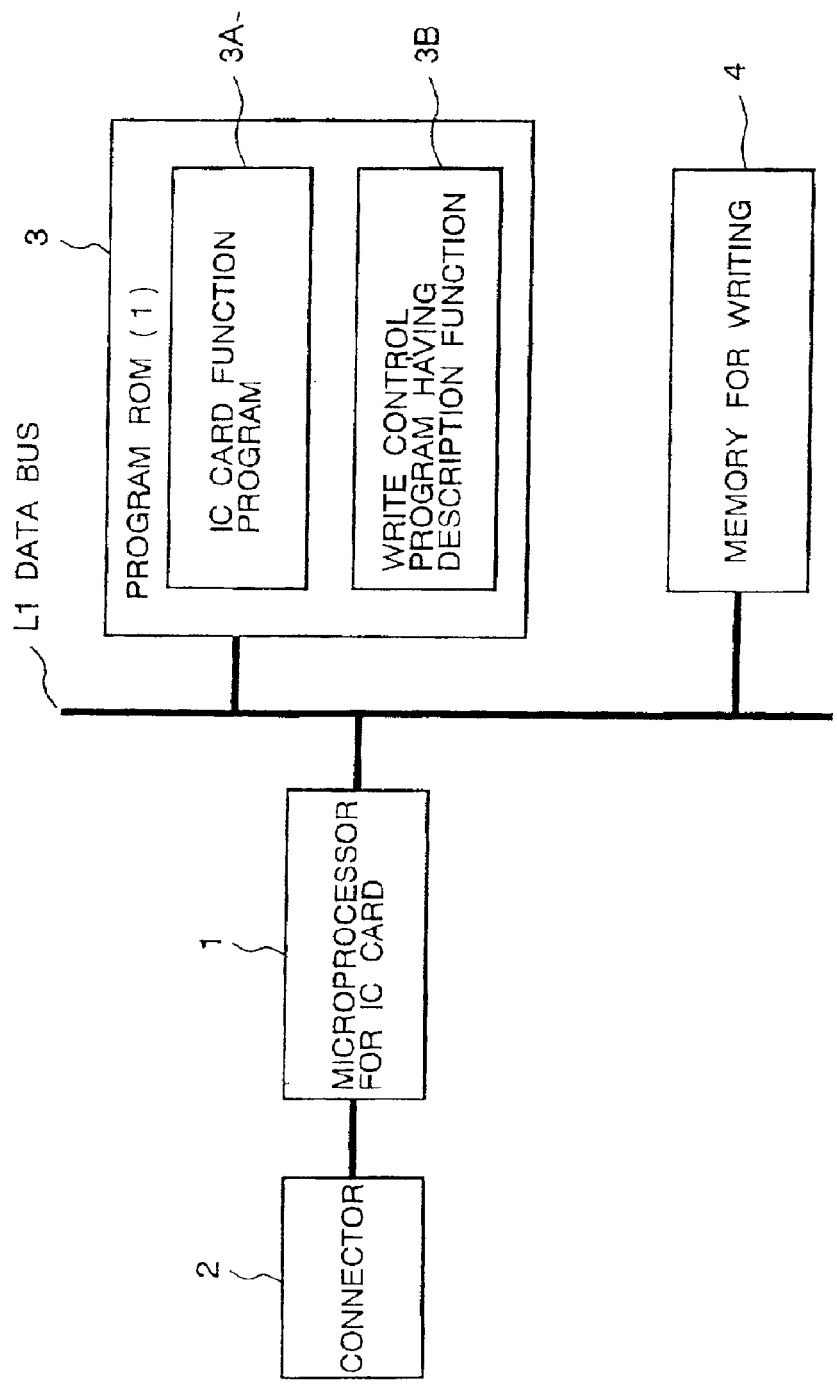
FIG. 1 is a block diagram showing a first embodiment of the program writable IC card of the present invention.

FIG. 1 is a block diagram showing a first embodiment of the writable IC card of the present invention. Numeral 1 indicates a microprocessor for IC card, 2 a connector with an external device, 3 a program ROM (1), 3A a program for realizing the IC card function, 3B a write control program having decryption function, 4 a memory for writing, and L1 a data bus.

The microprocessor for IC card 1, the connector 2, and the IC card function program 3A are components for realizing the original function of the IC card. An external instruction is given to the microprocessor 1 via the connector 2 and the IC card performs an operation according to this instruction. A write command for instructing writing is incorporated in the IC card function program 3A beforehand and the IC card function program 3A activates the write control program 3B by an external write instruction. The write control program 3B is provided with the decryption function beforehand and when the write control program 3B is activated, communication with the IC card requires a crypted command and data, a cryption key, and others. If a program, command, and data to be written later are not crypted correctly, they are rejected by the write control program 3B and the program and data cannot be written into the memory for writing 4. If a program to be written later is crypted, even if it is opened to public, a problem of loss of security will not arise and there is no need to manage the program writing process strictly. Therefore, in addition to keeping of security for a program in the IC card, security can be kept also for a program to be written later.

Figure 2:
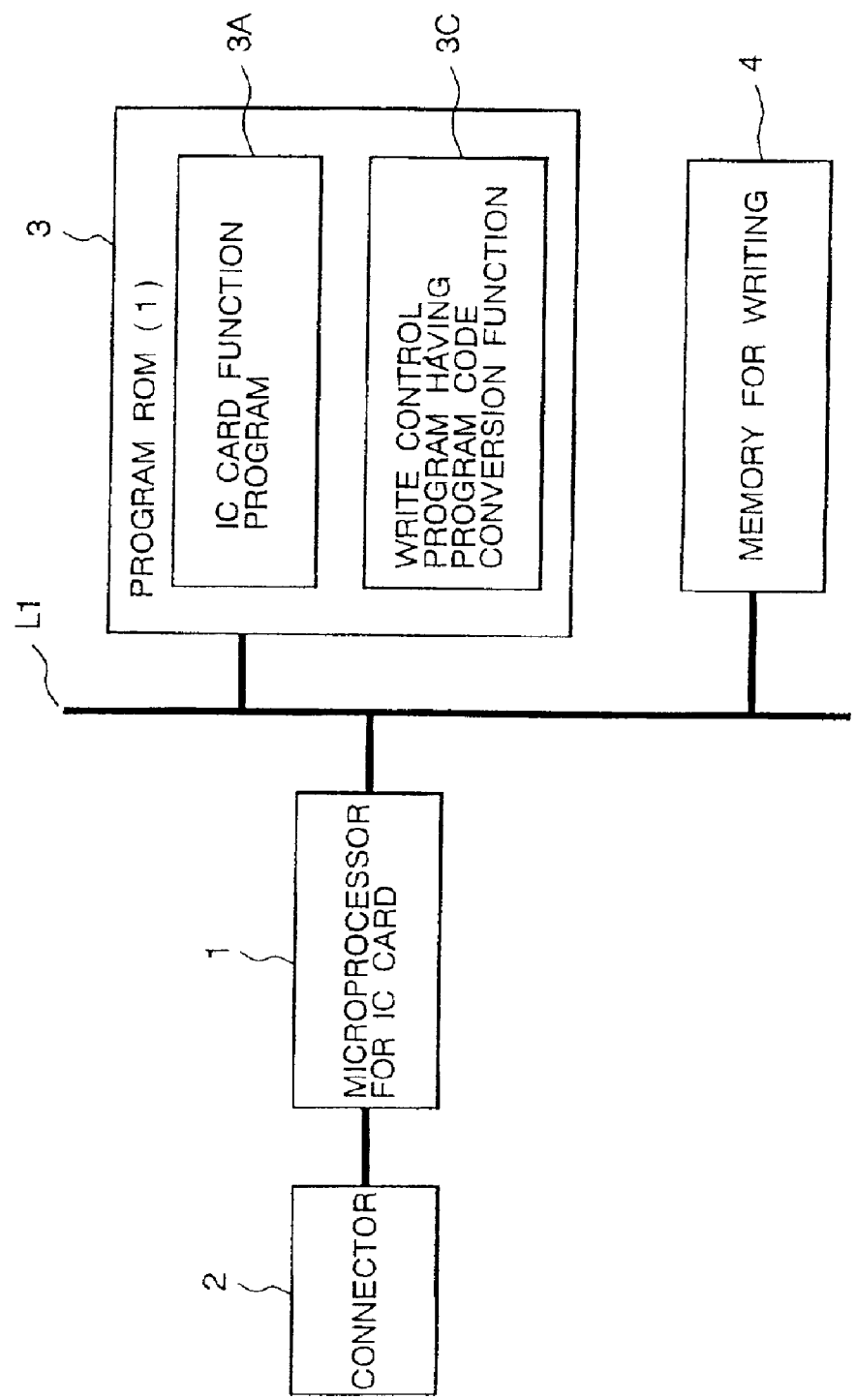
FIG. 2 is a block diagram showing a second embodiment of the program writable IC card of the present invention.

FIG. 2 is a block diagram showing a second embodiment of the writable IC card of the present invention. Numeral 1 indicates a microprocessor for IC card, 2 a connector with an external device, 3 a program ROM (1), 3A a program for realizing the IC card function, 3C a write control program having program code conversion function, 4 a memory for writing, and L1 a data bus.

The microprocessor for IC card 1, the connector 2, and the IC card function program 3A are components for realizing the original function of the IC card and the operations thereof are the same as those of the aforementioned first embodiment. A write command for instructing writing is incorporated in the IC card function program 3A beforehand and the IC card function program 3A activates the write control program 3C by an external write instruction. This write control program 3C has a function for converting a program code and a program to be written later is processed by this write control program 3C, converted in a different format from that of a code inputted from the connector 2, and then written into the memory for writing 4. This program to be written later is created in a location where the security thereof is managed and the program code thereof is converted beforehand according to a rule which is reverse to the program code conversion rule in the write control program 3C. By doing this, in the same way as with the first embodiment, in addition to keeping of security for a program in the IC card, security can be kept also for a program to be written later.

If the function of a prior art for converting a program code for microprocessor to a program code for microprocessor in an IC card which is not open to public is provided as a program code conversion function of the write control program 3C, there is no need to open the information on the microprocessor 1 in the IC card to public for a program developer. Namely, from an advantage that a program code to be given from the outside may be a known code and there is no need to open an instruction code of a program in the IC card to the outside, the security of the IC card can be kept and furthermore the program development efficiency can be improved. In this case, from a viewpoint of keeping of security, adding of a function for eliminating fetching of information on the IC card function program 3A by a program to be written later is effective.

If the write control program 3C has both the two functions explained in the first and second embodiments, that is, the decryption function and the program code conversion function, it is more effective in the respect of security keeping of the IC card.

Figure 3:
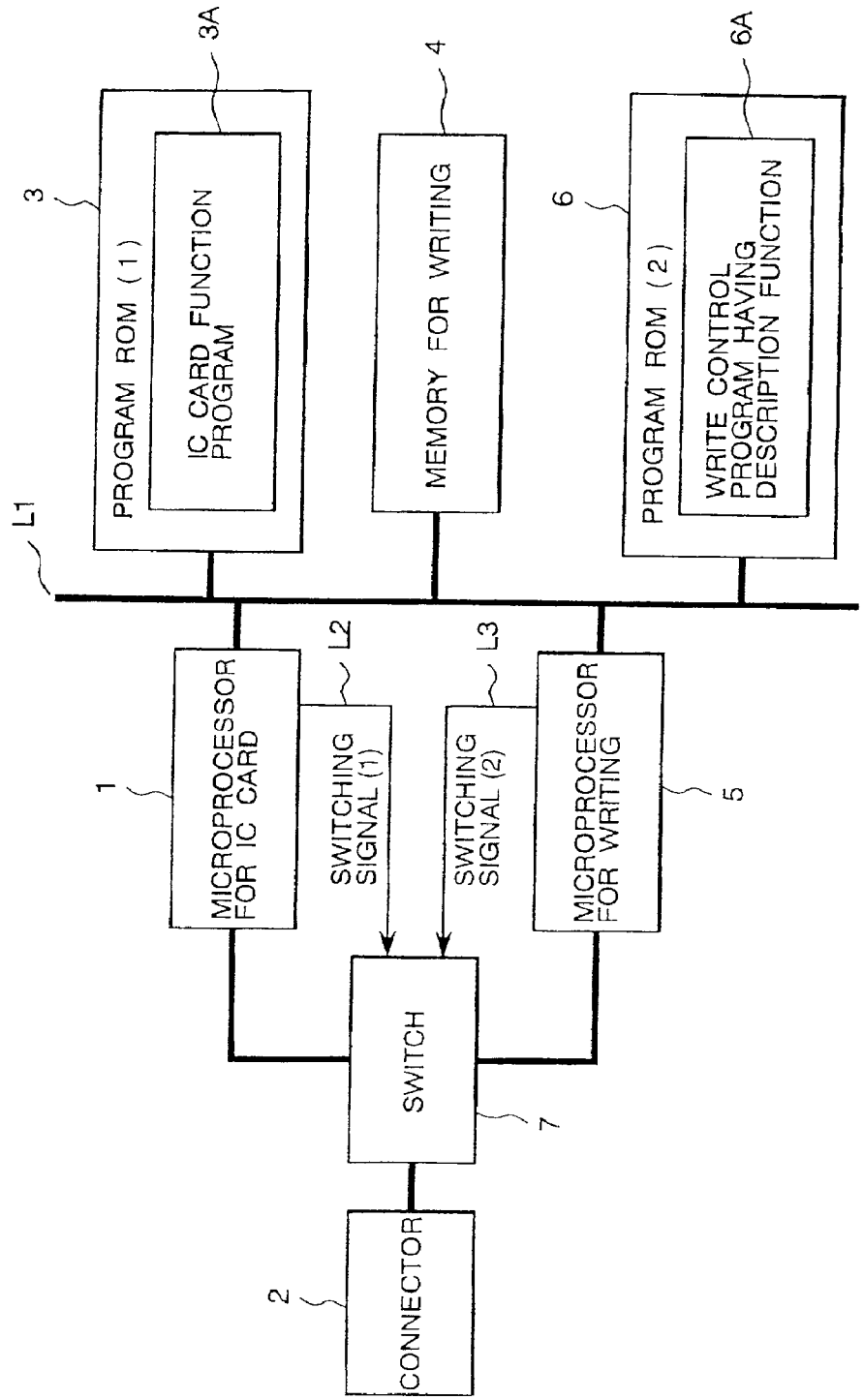
FIG. 3 is a block diagram showing a third embodiment of the program writable IC card of the present invention.

FIG. 3 is a block diagram showing a third embodiment of the writable IC card of the present invention. Numeral 1 indicates a microprocessor for IC card, 2 a connector with an external device, 3 a program ROM (1), 3A a program for realizing the IC card function, 4 a memory for writing, 5 a microprocessor for writing, 6 a program ROM (2), 6A a write control program having decryption function, 7 a switch, L1 a data bus, L2 a switching signal (1), and L3 a switching signal (2). The switch 7 is a means for selectively switching the microprocessors 1 and 5 connected to the connector 2 and switches them by the switching signals L2 and L3. When the switch 7 selects the microprocessor 1, the microprocessor 1, the connector 2, and the program ROM (1) 3 realize the original IC card function.

A write command for instructing writing is incorporated in the IC card function program 3A beforehand, and the switching signal (1) L2 is outputted from the IC card for microprocessor 1 by a write instruction from the outside, and the switch 7 is switched to the microprocessor for writing 5. The write control program 6A is provided with the decryption function. The write control program 6A executes the decryption function by the microprocessor for writing 5. Communication with the IC card after the switch 7 is switched to the microprocessor for writing 5 requires a crypted program, command, and data, a cryption key, and others. If a program, command, and data to be written later are not crypted correctly, they are rejected by the write control program 6A and the program and data cannot be written into the memory for writing 4. Therefore, in addition to keeping of security for a program in the IC card, security can be kept also for a program to be written later. When the IC card is structured like this, even if it can be switched to the write mode by an incorrect operation, if the process ends normally and the switch 7 cannot be returned to the microprocessor for IC card 1 by the switching signal L3, the use as an ordinary IC card can be made impossible forever and the security can be kept. This is an advantage which is not found in the first and second embodiments. Even in a constitution that one microprocessor is used, if it is used incorrectly, by adding a circuit receiving no external reset signal, the same effect can be obtained. Since the two microprocessors 1 and 5 are independent of each other, a microprocessor in a quite different format can be used and a constitution with higher security can be obtained.

Figure 4:
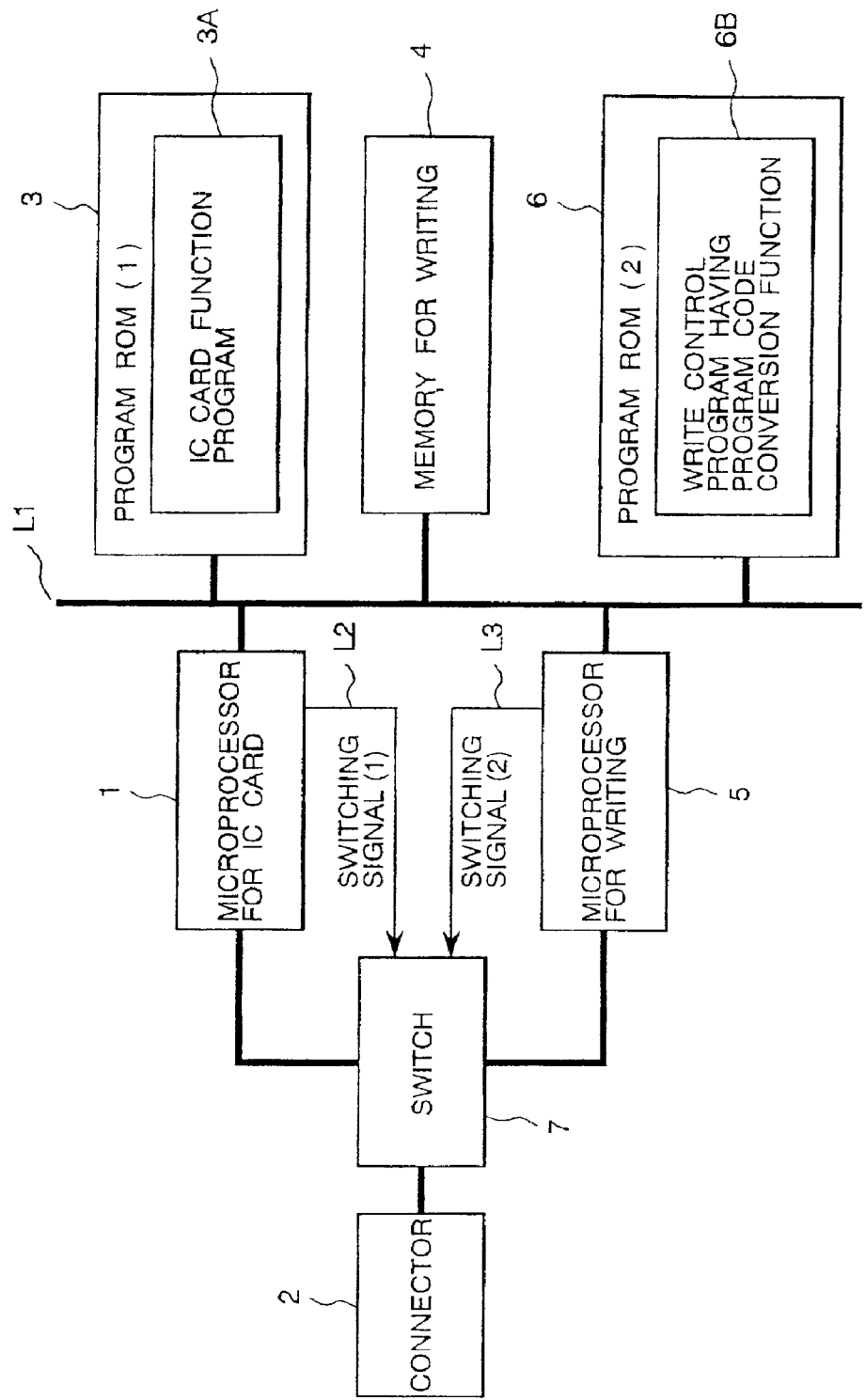
FIG. 4 is a block diagram showing a fourth embodiment of the program writable IC card of the present invention.

FIG. 4 is a block diagram showing a fourth embodiment of the writable IC card of the present invention. Numeral 1 indicates a microprocessor for IC card, 2 a connector with an external device, 3 a program ROM (1), 3A a program for realizing the IC card function, 4 a memory for writing, 5 a microprocessor for writing, 6 a program ROM (2), 6B a write control program having program code conversion function, 7 a switch, L1 a data bus, L2 a switching signal (1), and L3 a switching signal (2). The functional operation of this embodiment as an IC card and the switching operation for the two microprocessors are the same as those of the third embodiment mentioned above. This embodiment has both the functions of the second and third embodiments mentioned above.

If the write control program 6B is provided with both of the two functions explained in the third and fourth embodiments, that is, the decryption function and the program code conversion function, it is more effective in the respect of keeping of security of the IC card.

Figure 5:
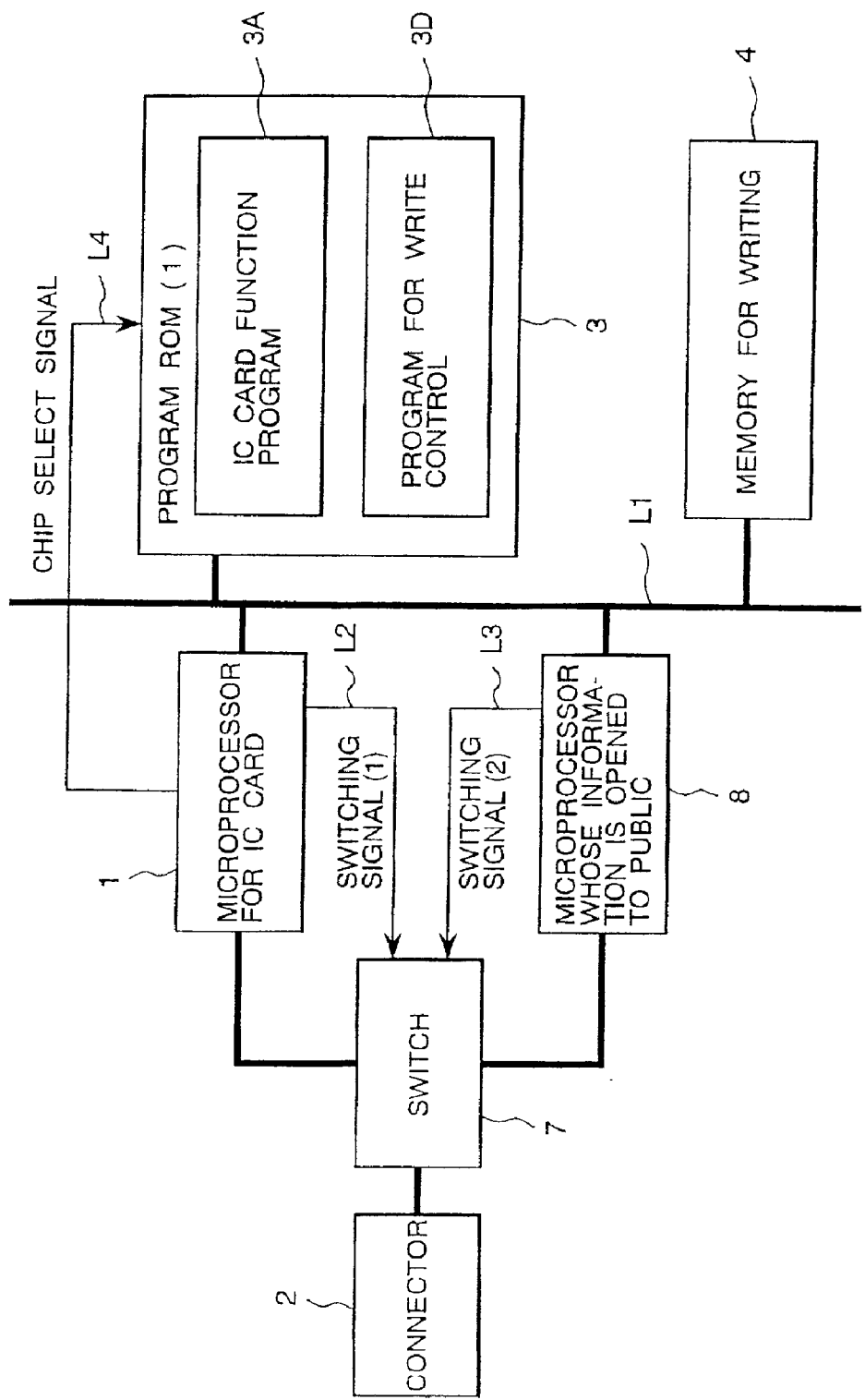
FIG. 5 is a block diagram showing a fifth embodiment of the program writable IC card of the present invention.

FIG. 5 is a block diagram showing a fifth embodiment of the writable IC card of the present invention. This embodiment shows a program writable IC card for keeping the internal security of the IC card by perfectly opening a program to be written later to the user side. Numeral 1 indicates a microprocessor for IC card, 2 a connector with an external device, 3 a program ROM (1), 3A a program for realizing the IC card function, 3D a program for write control, 4 a memory for writing, 7 a switch, 8 a microprocessor whose information is opened to public, L1 a data bus, L2 a switching signal (1), L3 a switching signal (2), and L4 a chip select signal. A program to be written into the memory for writing 4 is structured so as to be executed only by the microprocessor whose information is opened to public 8. The chip select signal L4 for the program ROM (1) 3 storing the IC card function program 3A is structured so as to be controlled only by the microprocessor for IC card 1. Therefore, it is impossible to access the program ROM (1) 3 by a program to be written later and the security of the IC card function can be kept.

The program writing operation for the memory for writing 4 is started when the microprocessor for IC card 1 activates the program for write control 3D by an external write instruction. The program for write control 3D performs a process of writing an external program and data into the memory for writing 4. The program in this case is created for the microprocessor whose information is already opened to public 8 and the security of the IC card function is kept inside the IC card, so that there is no need to protect a program to be written later.

This embodiment is a one which is suited to a use for making openly handling a program to be written later and keeping the security as an IC card compatible with each other.

Figure 6:
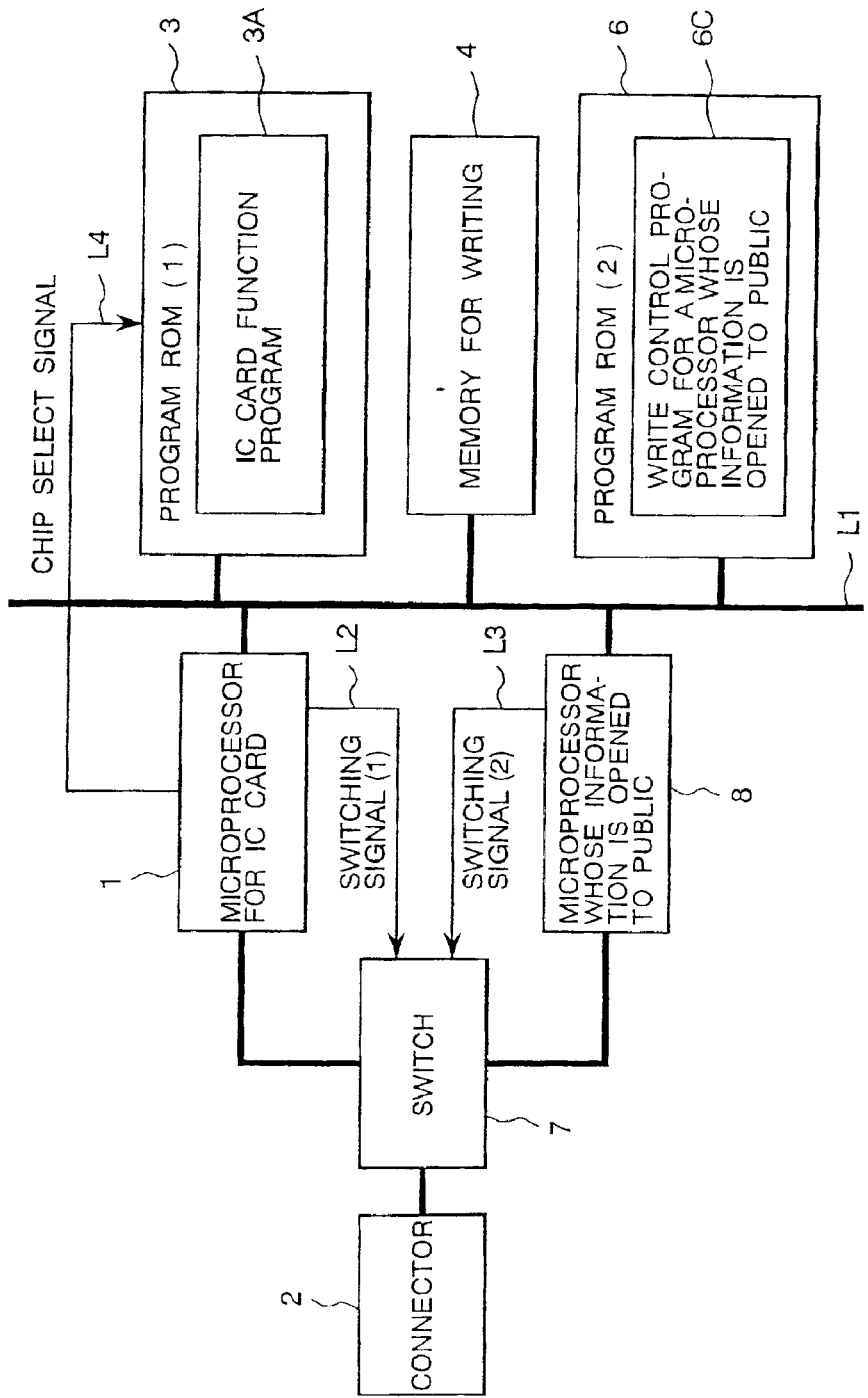
FIG. 6 is a block diagram showing a sixth embodiment of the program writable IC card of the present invention.

FIG. 6 is a block diagram showing a sixth embodiment of the writable IC card of the present invention. Numeral 1 indicates a microprocessor for IC card, 2 a connector with an external device, 3 a program ROM (1), 3A a program for realizing the IC card function, 4 a memory for writing, 7 a switch, 8 a microprocessor whose information is opened to public, 6 a program ROM (2), 6C a write control program for the microprocessor 8, L1 a data bus, L2 a switching signal (1), L3 a switching signal (2), and L4 a chip select signal. The respect of keeping the security of the IC card function by the chip select signal L4 is the same as that of the fifth embodiment.

According to this embodiment, the program ROM (2) 6 storing the write control program 6C for the microprocessor whose information is opened to public 8 is independent of the program ROM (1) 3 storing the IC card function program 3A, so that keeping of the security of the IC card function can be enhanced more.

When a program is to be written later, the microprocessor for IC card 1 passes the control process to the microprocessor whose information is opened to public 8 by the switching signal L2. The microprocessor whose information is opened to public 8 performs all the write control process according to the write control program 6C and returns the control process to the microprocessor for IC card 1 by the switching signal L3 when the write process ends.

According to the fifth and sixth embodiments, the development efficiency can be improved by use of a microprocessor whose information is opened to public under a catalog specification or operation specification. However, by combining the function for controlling writing like the other embodiments, the security for a program to be written later can be kept.

The memory for writing program 4 has no independent constitution and can serve as a memory for program of a microprocessor if it is writable.

In each aforementioned embodiment, a memory which can write only once can be used for the aforementioned memory for writing.

Effects of the Invention

As mentioned above, according to the present invention, an IC card which keeps the security of the IC card function high and can write a program later can be obtained.

What is claimed is:

1. A program writable IC card comprising:

a microprocessor;

a first memory which stores both a first program to be executed by said microprocessor and a decryption program, executable by said microprocessor, having a decryption function, wherein said first memory is a read only memory (ROM) which is not re-writable, and a second memory capable of storing a second program, wherein said microprocessor applies said decryption function to an encrypted second program, which has been encrypted based on an encryption key, according to said decryption program and then stores a decrypted second program, which is executable by said microprocessor, in said second memory, when said encrypted second program is provided from outside the IC card, wherein when said encrypted second program is not encrypted correctly, writing of said encrypted second program is rejected.

2. A program writable IC card, comprising:

a microprocessor;

a first memory which stores both a first program which is executed by said microprocessor and a write control program, executable by said microprocessor, having a decryption function, wherein said first memory is a read only memory (ROM) which is not re-writable, and a second memory in which may be written a second program, wherein said microprocessor applies said decryption function to an encrypted second program, which has been encrypted based on an encryption key, and then writes a decrypted second program, which is executable by said microprocessor, in said second memory according to said write control program, when said encrypted second program is inputted from outside the IC card, wherein when said encrypted second program is not encrypted correctly, writing of said encrypted second program is rejected.

3. A program writable IC card comprising:

a microprocessor, a first memory which stores a first program which is executed by said microprocessor and a second program, executable by said microprocessor, for decrypting an encrypted program, wherein said first memory is a read only memory (ROM) which is not re-writable;

a second memory which is able to store a third program; and an input unit which inputs an encrypted third program, which has been encrypted based on an encryption key, from outside the IC card, wherein said microprocessor applies said second program to said encrypted third program inputted by said input unit, stores a decrypted third program which is executable by said microprocessor in said second memory and then executes said decrypted third program stored in said second memory, and wherein when said encrypted third program is not encrypted correctly, writing of said encrypted third program is rejected.

4. A program writable IC card, comprising:

a microprocessor;

a first memory which stores a first program having a decryption function which is executed by said microprocessor, wherein said first memory is a read only memory (ROM) which is not re-writable; and a second memory which is able to store a second program, wherein said microprocessor applies said decryption function to an encrypted second program, which has been encrypted based on an encryption key, according to said first program and then stores a decrypted second program which is executable by said microprocessor in said second memory, wherein said encrypted second program is initially supplied from outside the IC card, and wherein when said encrypted second program is not encrypted correctly, writing of said encrypted second program is rejected.

5. A program writable IC card according to claim 1, wherein said first program performs an original function of the IC card.

6. A program writable IC card according to claim 2, wherein said first program is an IC card function program for realizing an original function of the IC card.

7. A program writable IC card according to claim 3, wherein said first program performs an original function of the IC card.

8. A program writable IC card according to claim 3, wherein said first program performs an original function of the IC card.

9. A processing method for a program writable IC card having a microprocessor, a first memory which stores both a first program which is executed by said microprocessor and a decryption program having a decryption function, wherein said first memory is a read only memory (ROM) which is not re-writable, and a second memory, said processing method comprising:

inputting an encrypted second program, which has been encrypted based on an encryption key, from outside the IC card;

decrypting said encrypted second program according to said decryption program;

storing a decrypted second program in said second memory, said decrypted second program being executable by said microprocessor, and rejecting writing of an encrypted second program when said encrypted second program is not encrypted correctly.

10. A processing method for a program writable IC card having a microprocessor, a first memory which stores both a first program which is executed by said microprocessor and a decryption program having a decryption function, wherein said first memory is a read only memory (ROM) which is not re-writable, a second memory, and an input unit, said processing method comprising:

inputting from an external device an encrypted second program, which has been encrypted based on an encryption key, via said input unit;

decrypting said encrypted second program according to said decryption program;

storing a decrypted second program in said second memory, said decrypted second program being executable by said microprocessor;

executing said decrypted second program stored in said second memory; and rejecting writing of an encrypted second program when said encrypted second program is not encrypted correctly.

11. A processing method for a program writable IC card having a microprocessor, a first memory which stores a decryption program executed by said microprocessor, wherein said first memory is a read only memory (ROM) which is not re-writable, and a second memory, said processing method comprising:

inputting an encrypted second program, which has been encrypted based on an encryption key, from an external device;

decrypting said encrypted second program according to said decryption program; and storing a decrypted second program in said second memory, wherein said second memory can be written only once, and wherein said decrypted second program is executable by said microprocessor; and rejecting writing of an encrypted second program when said encrypted second program is not encrypted correctly.

12. A writing method for an IC card having a microprocessor, a ROM device which stores a first program which is executed by said microprocessor, a write control program having a decryption function, and a writable memory, said writing method comprising:

inputting an encrypted second program, which has been encrypted based on an encryption key, from an external device;

decrypting said encrypted second program according to said write control program;

storing a decrypted second program in said writable memory according to said write control program, said decrypted second program being executed by said microprocessor;

rejecting writing of an encrypted second program when said encrypted second program is not encrypted correctly.

13. A writing method for an IC card having a microprocessor, a ROM device which stores both a first program which is executed by said microprocessor, a decryption program having a decryption function, a writable memory, and an input unit, said writing method comprising:

inputting an encrypted second program, which has been encrypted based on an encryption key, via said input unit from an external device;

decrypting said encrypted second program according to said decryption program;

storing a decrypted second program in said writable memory, said decrypted second program being executable by said microprocessor;

executing said decrypted second program stored in said writable memory; and rejecting writing of an encrypted second program when said encrypted second program is not encrypted correctly.

14. A program writable IC card comprising:

a first memory which stores a first program having a decryption function, wherein said first memory is a read only memory (ROM) which is not re-writable;

a second memory to store a second program;

an input unit which inputs an encrypted second program from outside the IC card; and a microprocessor according to said first program, applies said decryption function to said encrypted second program, and then writes a decrypted second program, which is executable by said microprocessor, in said second memory, wherein, when said encrypted second program is not encrypted correctly, said second program is not written in said second memory.

* * * * *